(12) United States Patent  
Gonzalez Marti

(10) Patent No.: US 8,294,923 B2
(45) Date of Patent: Oct. 23, 2012

(54) PRINTING OF ELECTRONIC DOCUMENTS

(76) Inventor: Carlos Gonzalez Marti, Madrid (ES)

( * ) Notice: Subject to any disclaimer, the term of this patent is extended or adjusted under 35 U.S.C. 154(b) by 810 days.

(21) Appl. No.: 10/627,348

(22) Filed: Jul. 25, 2003

(65) Prior Publication Data

US 2005/0018213 A1    Jan. 27, 2005

(51) Int. Cl.
  *G06F 3/12*  (2006.01)
  *G06K 7/10*  (2006.01)
  *G06K 19/01* (2006.01)

(52) U.S. Cl. .................. 358/1.15; 358/1.1; 235/462.01; 235/462.02; 235/462.05; 235/494

(58) Field of Classification Search .................. 358/1.13; 235/462.1; 713/176, 168
See application file for complete search history.

(56) References Cited

U.S. PATENT DOCUMENTS

| | | | |
|---|---|---|---|
| 6,535,299 B1 * | 3/2003 | Scherz ........................ | 358/1.18 |
| 6,750,978 B1 * | 6/2004 | Marggraff et al. ........... | 358/1.12 |
| 6,765,685 B1 * | 7/2004 | Yu ................................ | 358/1.13 |
| 6,892,947 B1 * | 5/2005 | Jam et al. ................. | 235/462.01 |
| 6,906,812 B2 * | 6/2005 | Koakutsu et al. ............ | 358/1.13 |
| 7,025,269 B2 * | 4/2006 | Marshall .................. | 235/462.01 |
| 7,028,902 B2 * | 4/2006 | Xu et al. ..................... | 235/462.1 |
| 7,034,952 B2 * | 4/2006 | Okuda et al. .................. | 358/1.15 |
| 7,065,645 B2 * | 6/2006 | Teicher ......................... | 713/167 |
| 7,150,399 B2 * | 12/2006 | Barrus et al. ............. | 235/462.01 |
| 7,328,847 B1 * | 2/2008 | Shen et al. ................ | 235/462.01 |
| 7,555,650 B1 * | 6/2009 | Zhao et al. .................... | 713/176 |
| 2004/0065739 A1 * | 4/2004 | Xu et al. .................... | 235/462.1 |
| 2004/0128513 A1 * | 7/2004 | Wu et al. ........................ | 713/176 |
| 2004/0199778 A1 | 10/2004 | Wernet et al. ................ | 358/1.15 |

FOREIGN PATENT DOCUMENTS

JP         11203379 A  *  7/1999

* cited by examiner

*Primary Examiner* — Hilina S Kassa
(74) *Attorney, Agent, or Firm* — Merchant & Gould P.C.

(57) ABSTRACT

An electronic document is distributed for use as a form wherein users can fill in characters in selected fields. The electronic document contains an embedded program for printing a bar code that represents the characters entered in the fields. The embedded program generates commands for making a printer print basic geometrical elements (such as polygons) that form configurations that represent the characters (or compactions of characters etc.). Thus on one hand bar codes can be generated in the distributed document after the user has entered data and on the other hand the author of the document retains full control over how the entered characters will be converted into a bar code. Preferably, the embedded program has the capability to adapt the configuration of geometrical elements that is used to represent the characters dependent on factors other than the data values that can be decoded from the bar code.

27 Claims, 3 Drawing Sheets

PRINTING OF ELECTRONIC DOCUMENTS

FIELD OF THE INVENTION

The invention relates to printing of electronic documents, and in particular to printing of documents that include barcodes. The invention also relates to a computer readable medium that contains an electronic document and a document processor that contains such an electronic document.

BACKGROUND ART

In electronic document processing a distinction is made between capabilities granted to authors of documents and to users of documents. Authors use authoring software to create documents and distribute electronic files that represent the documents to users, via the Internet for example. Users use viewer software to view the documents on their own computer, with no, or very limited editing capability. The Adobe Acrobat Reader (R) is an example of a computer program that can be used to view and print electronic documents.

Advanced document viewer software like Adobe Acrobat Reader (R) supports interactive "forms". An electronic form is an electronic document that has been created by an author, in which the author has defined one or more "fields" that can be filled in by users of copies of the document. When the viewer software runs on the computer of the user, and the user loads an electronic form, the software permits the user to enter data at specific positions in the electronic form, as defined by the fields. When the copy of the document is subsequently printed the data is printed at the specific positions in the document, so that the printed document becomes partly specific to the user.

Some electronic documents include barcodes to facilitate processing of the printed version of the documents. Barcodes are of course well known per se and include not only extremely familiar barcodes made up of vertical bars in ink against an uninked background, but also other dedicated standardized machine readable patterns of geometrical elements such as configurations of inked polygons (in particular rectangles or hexagons) against a background. In this sense the term barcode, as also used herein, is not limited to codes made up of bars, but extend to any printed geometrical pattern for standardized machine encoding and decoding. In particular, barcodes ensure that the process of data capture from the printed documents will later take considerably less work.

It is not difficult to add a static barcode at the time of authoring. Any static barcode can be added by including picture data that defines a bit map of the barcode. It would be desirable that barcodes could also be printed dependent on data that has been entered by the user into the fields in a form, preferably in addition to rendering in normal human readable characters. In this case it is desirable to generate the barcode at the document processor, once the form is filled.

In one implementation, this can be realized by a making use of an installed barcode generation library at the user computer and including function calls to this library in the electronic document to generate barcodes. However, this makes the distribution of electronic documents dependent on installed programs. The author of the document has no control over these programs. Electronic documents may thus have different effects on different user computers, or may not even work at all when no library is installed.

Another implementation uses a barcode "font" that defines barcode symbols assigned to respective characters. The author of a form ensures printing of a barcode by specifying that data entered in a field should be printed using the barcode font instead of conventional digits.

When the necessary font is not installed on a computer, problems arise when the document has to be printed. More generally, the use of commands to print a string of characters with a specific font is an inflexible solution, which limits the kind of barcodes that can be printed. Other than by supplying different characters the generated barcode cannot be adapted to make the barcode document or user specific.

These problems can partly be solved by embedding a barcode font definition in the electronic document. The font definition in the document defines a closed collection of geometrical shapes, one for each possible character, that should be printed to render respective characters. However, this solution still does not overcome all problems associated with fonts. Some two dimensional barcodes cannot even be printed at all as characters printed with a font. For example, some two dimensional barcodes define a two dimensional matrix of positions where spatial blocks must be printed to represent bits of codewords that are derived by compacting characters. The bit positions for a codeword form a respective spatial block in the printed document, but the blocks need not all be arranged in rows or columns, and may even not be rectangular. Such an arrangement of blocks cannot be printed by printing the blocks font symbols selected by successive characters. Moreover, printing with a font does not support computations that are useful for character encoding, such as compaction and generation of error correction symbols, Also, the same geometrical shape must always be used for the same character.

An additional problem is that unscrupulous persons might attempt to tamper with the printed document, so that false data will be captured when the barcode is captured, by physically replacing a barcode of a document with a different barcode that is not consistent with the information printed with human readable characters. Such a false barcode can easily be generated when a commonly available standard barcode font is used to generate the barcodes in a document.

Among others, it is an object of the invention to enable printing of electronic forms with barcodes that encode user defined data, in which the barcodes can be generated more flexibly.

Among others, it is an object of the invention to enable generation of dependent on user defined data without having to rely on pre-installed modules in a user computer such as fonts or libraries.

Among others, it is a further object of the invention to take measures against tampering with bar codes in a printed version of an electronic form.

Among others, it is a further object of the invention to make it possible to include any kind of two dimensional barcode that encodes user entered data in a printed version of an electronic form.

Among others, it is a further object of the invention to make it possible to include barcodes, without needing to embed a font definition in the electronic form.

The invention provides for a method of obtaining printed instances of a document. According to the invention the document contains an embedded program, for controlling printing of geometrical elements of a bar code in an instance of the document, dependent on user data entered in an input field in the document. The embedded program is linked to the user data input field in the sense that, when the document is printed the program will be called with the string from the field as argument; thus there is preferably a freedom to choose the program that is linked to a field. Different programs may be linked to different fields, or the same program could be linked to different fields.

Each program uses codewords, which are numerical values that each represent a respective character that has been entered in the field, or compactions of the characters, or error correction codewords derived from the characters etc The barcode in the printed document is made up of a number of different areas, each containing a configuration of geometrical elements, each configuration representing a respective codeword, in the sense that after scanning the barcode each of the codewords can be decoded from a respective configuration of all printed geometrical elements and the background in a respective one of the areas. The program generates commands to print individual geometrical elements of configurations of elements that, as a configuration, represent a codeword in the respective area of the barcode. The geometrical elements are for example polygons (e.g. rectangles or hexagons) for which printing commands exist for on the printer, so that the printer does not need to support specific commands for printing barcodes, and the generated commands each command printing one such general purpose geometrical element.

Preferably, the embedded program has the flexibility to make the configurations dependent on the specific area in the printed document in which each codeword is represented. Each area corresponds to a respective codeword and contains a configuration of all geometrical elements and the background that represent the codeword, no geometrical elements that represent other codewords are contained in the area. The program may select to generate commands to draw any one of a number of different configurations to represent a codeword, dependent on where the codeword represented in the printed document.

Because the program is embedded in the electronic form (i.e. the program travels with the document and does not need to be installed separately) a general purpose viewer may be used, which is not specifically prepared to generate barcodes or even two-dimensional barcodes. An Adobe Acrobat (R) viewer may be used, for example.

Any kind of two dimensional barcode may be drawn in this way, including for example barcodes that use a map of differently shaped areas within the barcode, wherein each area represents a respective codeword and contains a configuration of all geometrical elements and the background that represent the codeword with the particular shape of the area. Similarly an area in which a codeword is represented may contain disjoint parts that are separated by areas in which other codewords are represented.

The embedded program controls all the properties of the printed geometrical elements that, together, form the printed barcode. Because an embedded program is used, the configurations of geometric elements of the barcode can be flexibly adapted in ways that will not affect the result of decoding of the barcode, in so far as the barcode is decoded according to the standard that defines the barcode. The adaptations can be used to communicate additional visual information by means of the barcode, so that the additional visual information is preferably prima facie recognizable for humans (i.e. without having to decode the barcode, and if desired irrespective of the codewords).

The additional information may include information that makes it difficult to replace the barcode unnoticeably in a printed document. The additional information may also include information that represents a company logo, for example. Preferably, the embedded program is arranged to make adaptations to the barcode so that different geometrical elements within the same area (which contains all geometrical elements and their background that represent a codeword and no geometrical elements or background that represent other codewords from the barcode) can be adapted independently.

The adaptations may involve adding geometrical elements for use in the printed the barcode, so that the added elements are recognizable by themselves when printed, for example because they are in a different color from other elements of the barcode, or so that the added elements are recognizable in combination with elements that are added to the printed document outside the barcode, for example as the extension of lines added to the printed document. The adaptations may also involve changing the color or grey level density of selected geometrical elements of the barcodes. The adaptations may also involve removing geometrical elements of the barcodes altogether, if the removal can be corrected by an error correction mechanism defined for the barcode. The adaptations may also involve to modify certain geometrical elements from a barcode so that a geometrical element of a first barcode is formed by a second barcode (encoding another string of characters), preferably of a different type, without affecting later decoding of any of the first or second barcode, creating the concept of "sub barcode in barcode".

The invention also provides for an electronic form that contains an embedded program of machine executable instructions to control drawing of elements of a barcode in a printed version of the electronic form, dependent on data entered by a user into fields of the electronic form. With such a form the user is enabled to fill in the data to be represented by the barcode interactively using a document viewer, without being permitted to edit the document in its entirety. Such electronic forms can be distributed as messages via the Internet or on data carriers such as magnetic or optical disks.

The invention also provides for a method for authoring an electronic form by editing an embedded program for generating barcodes, so that effectively the barcode is authored to make it user defined data or even document specific, within the restrictions imposed by decodability.

BRIEF DESCRIPTION OF THE DRAWING

These and other objects and advantages aspects of the invention will be illustrated using the following figures

DETAILED DESCRIPTION

Figure 1:
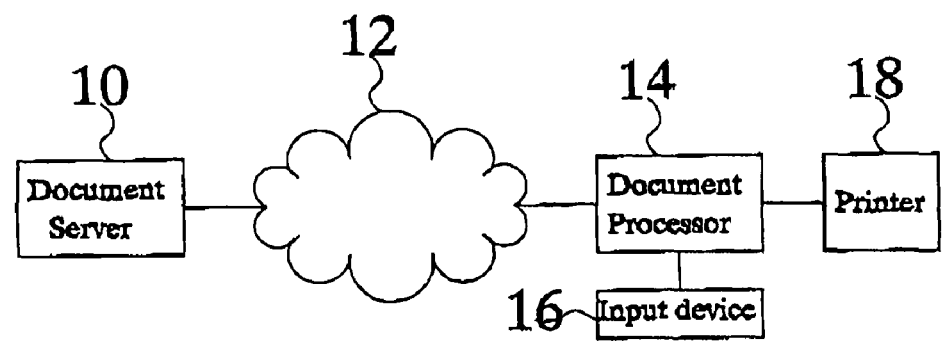
FIG. 1 shows a document processing system

FIG. 1 shows a document processing system, containing a document server 10, a network 12, a document processor 14, an input device 16 and a printer 18. Document server 10 and document processor 14 are coupled to each other via network 12, which may be the Internet, for example. Document processor 14 is coupled to input device 16 (a keyboard, for example) and printer 18. In operation document server 10 transmits electronic document data, in the form of a PDF file, for example, to document processor 14. Document processor 14 uses the electronic document data to control printing by printer 18. Typically, document processor 14 executes a browser program, such as Adobe Acrobat Reader (R) that uses the electronic document data as instructions to control the information printed on a printed page.

Figure 2:
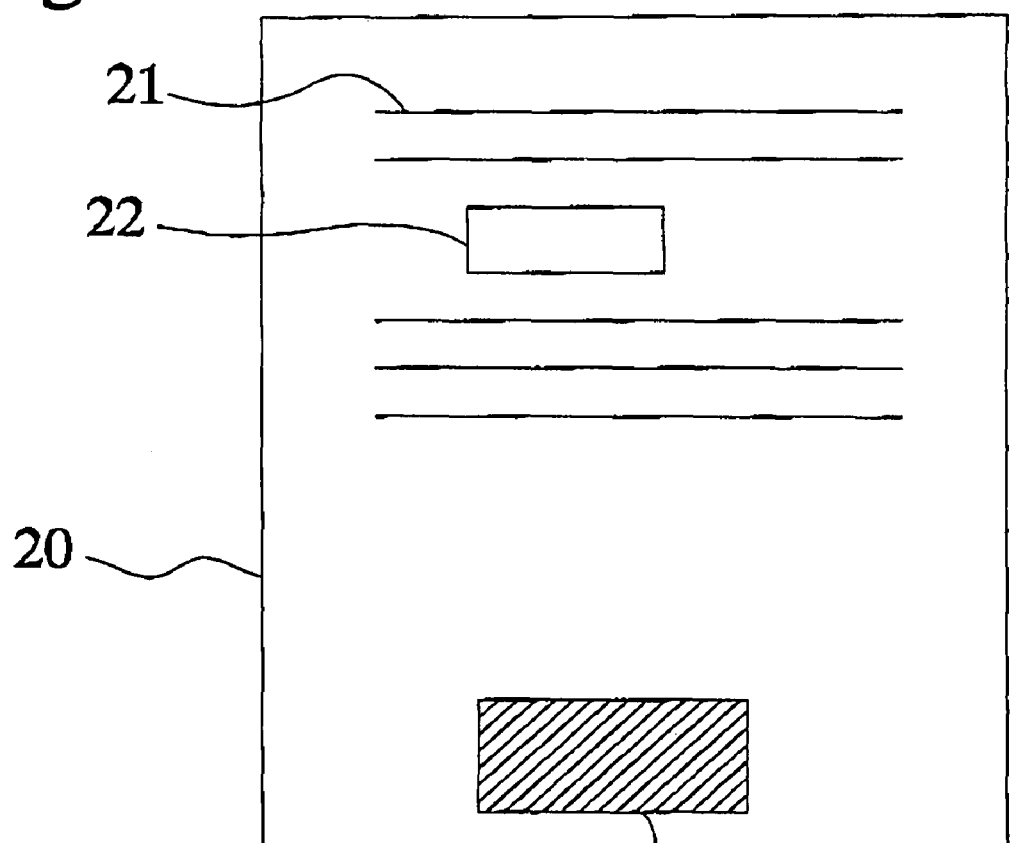
FIG. 2 shows a printed form

FIG. 2 shows a typical printed document page 20. Page 20 contains lines of text 21, whose content is determined by the electronic document data Page 20 also contains a field 22 whose content is at least partly controlled by user input information entered by a user on input terminal 16 (more than one such field may be present). Furthermore, page 20 contains barcode area 24 whose content is also at least partly controlled by the user input information Document processor 14 has at least two functions: it generates an image of the content of the document on a display screen as a function of the electronic document data received from document server 10, and upon a command of a user it generates commands for printer 18 to control the content of the printed content page 20 as a function of the electronic document data. Under control of instructions in the electronic document, document processor 14 also accepts user input information from input terminal 16. Document processor 14 adapts the commands that it supplies for printer 18 to print the document, dependent on the user input information in a way controlled by instructions from the electronic document data.

The electronic document data contains instructions for document processor 14. The instructions include first instructions of a known type to generate predetermined (authored) text or graphics of the document, i.e. irrespective of any user input. The instructions include second instructions of a known type to receive user input information from input terminal 16. Second instructions may define an input, such as a field in a PDF file, for example, that has to be displayed when an image of the electronic document is displayed. The second instructions also define one or more instructions that have to be executed when the user has entered user input information into the field.

Furthermore, the instructions include third instructions that define what commands have to be generated for printer 16 to draw a barcode responsive to user input information. The barcode may conform to any standard bar code definition. A well known barcode standard, for example, defines barcodes made up of a series of successive groups vertical dark bars alternating with lighter bars. Each group encodes a character. The widths of the bars in each group are selected dependent on the encoded character. Other barcodes include standards that define two dimensional barcodes made up of a collection of light and dark polygons at positions determined by the encoded codewords, or a collection of lines at angles selected dependent on the encoded information etc. It should be noted that the words "barcode", as used herein, covers all these standards and has a generalized sense of any standardized system of printed machine interpretable elements, not limited to the use of vertical bars.

In the case when a PDF file is used as an electronic document, for example, the document contains instructions in machine readable format, which are effectively equivalent to the following human readable instructions:

```
function generateBarcode(list of codewords)
{       instructions to generate printer commands that draw
        configurations of geometrical elements of the barcode (such as
        rectangles), each configuration representing a codeword from the
        list
}
function encodeString(string)
{       instructions to encode string values into codewords, and adding
        aditional elements such as checksum values and error correction
        codewords
```

```
}
var field = this.getField("myField")
define response to editing the field as
generateBarcode(encodeString(field.value));
```

Figure 3:
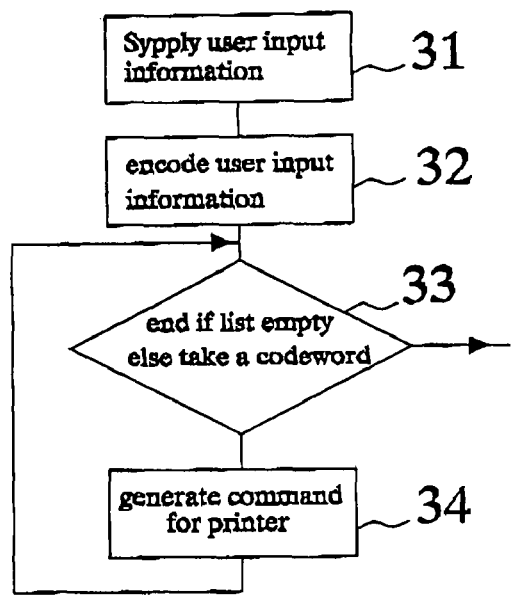
FIG. 3 shows a flow chart

FIG. 3 shows a flow chart of the process executed by document processor 14 under direction of the third instructions. In a first step 31 the third instructions instruct document processor 14 to supply the user input information that affects the barcode, typically in the form of a string of character information (representing, for example, a number entered by the user). Optionally, additional information that affects the barcode is supplied, the additional information being derived from the electronic document data as transmitted In a second step 32, the third instructions instruct document processor 14 to encode the user input information and the optional additional information into a list of codewords that has to be represented in the barcode. Encoding involves for example compacting combinations of characters from different positions in the string into codewords, and adding error detection and/or correction codewords.

In a third step 33 the third instructions instruct document processor 14 to take one codeword of the list of codewords that has to be processed. If the list is empty the flow chart ends.

In a fourth step 34 the instructions instruct document processor 14 to generate commands for printer 18 to draw basic geometric shapes (such as rectangles or hexagons) with specified color, height and width at a specified position in a configuration of geometric shapes that represents this codeword in an area of the barcode in the printed document, in the sense that the codeword can be decoded from the geometrical elements and their background in the area. The location and optionally the shape of the area is determined by the position of the codeword in the list. The third instructions instruct document processor 14 to generate a plurality of commands to print the barcode in terms of a plurality of geometric elements that represent the codewords in a specified configuration (Note that a geometric element, as used herein, is not a whole barcode configuration that represents a codeword, but merely one of a number of elements of a basictype (such as rectangles or hexagons) from which any barcode is composed).

For example, the third instructions instruct document processor 14 to generate commands for printer 18 of the form
Set Color <first color value>
Draw Rectangle <$1^{st}$ position value $1^{st}$ width value and $1^{st}$ height value>
Set Color <second color value>
Draw Rectangle <$2^{nd}$ position value $2^{nd}$ width value and $2^{nd}$ height value>
SetColor($n^{th}$ color value)
Draw Rectangle <$n^{th}$ position value $n^{th}$ width value and $n^{th}$ height value>

At the end of the fourth step 34 document processor 14 removes the selected codeword from the list of codewords that has to be processed and returns to third step 33. It should be appreciated that, in case of a linear barcode, the commands preferably control printer 18 to draw bar codes from successive codewords from the list which are at geometrically linearly successive positions in the barcode area. However, the sequence of the commands may differ from the geometrical sequence. In particular in case of a two dimensional barcode a random sequence, not determined by the geometrical position may be used.

The third instructions may be included in the electronic document for example as a series of instructions in a script language such as JavaScript for execution when the documents processor 14 generates commands for printer 18 after user input information has been entered, or as a function definition, the function being executed when the documents processor 14 generates commands for printer 18 after user input information has been entered.

The third instructions are adapted to create the configurations in the printed information in barcode area 24 dependent on the particular area. That is, the same codeword will cause the embedded program to generate commands to print different configurations, dependent on whether the codeword is represented in one area or another, not just the same configuration translated to another area.

The dependence on the area can take different forms. In one embodiment the configuration is adapted differently in different areas in a way that does not affect the information that can be retrieved from barcode area 24 when the barcode is decoded according to its standard definition. This may be used for example to make it difficult for unscrupulous persons change the barcode after the document has been printed. Another application is the addition of human noticeable information to the barcode without altering the information that will be decoded when the barcode is read according to its standard definition, for example by adding a simple logo etc.

For example, most barcode standards do not specify the colors that should be used for encoding the barcodes, or specify only a range within which a contrast between different colors should lie (or the range of any other parameter). In the further embodiment the third instructions direct document processor 14 to vary the color of individual geometrical elements of the barcode dependent on information from the electronic document and/or user input information at predetermined positions in the barcode so that this does not affect the information that will result when the barcode is decoded.

As another example, most barcode standards provide for decoders that work properly even if there are some meaningless lines in the barcode or if elements of the barcode have been obliterated, or printed unsharply. This is compensated for by error correction techniques, or optical techniques. In an alternative embodiment the third instructions direct document processor 14 to or add or remove elements in the barcode in the printed document, or print selected elements as composites of smaller elements, that are selected independent of the string that is encoded in the barcode, but dependent on other information from the electronic document, so that this does not affect the information that will result when the barcode is decoded.

Figure 4:
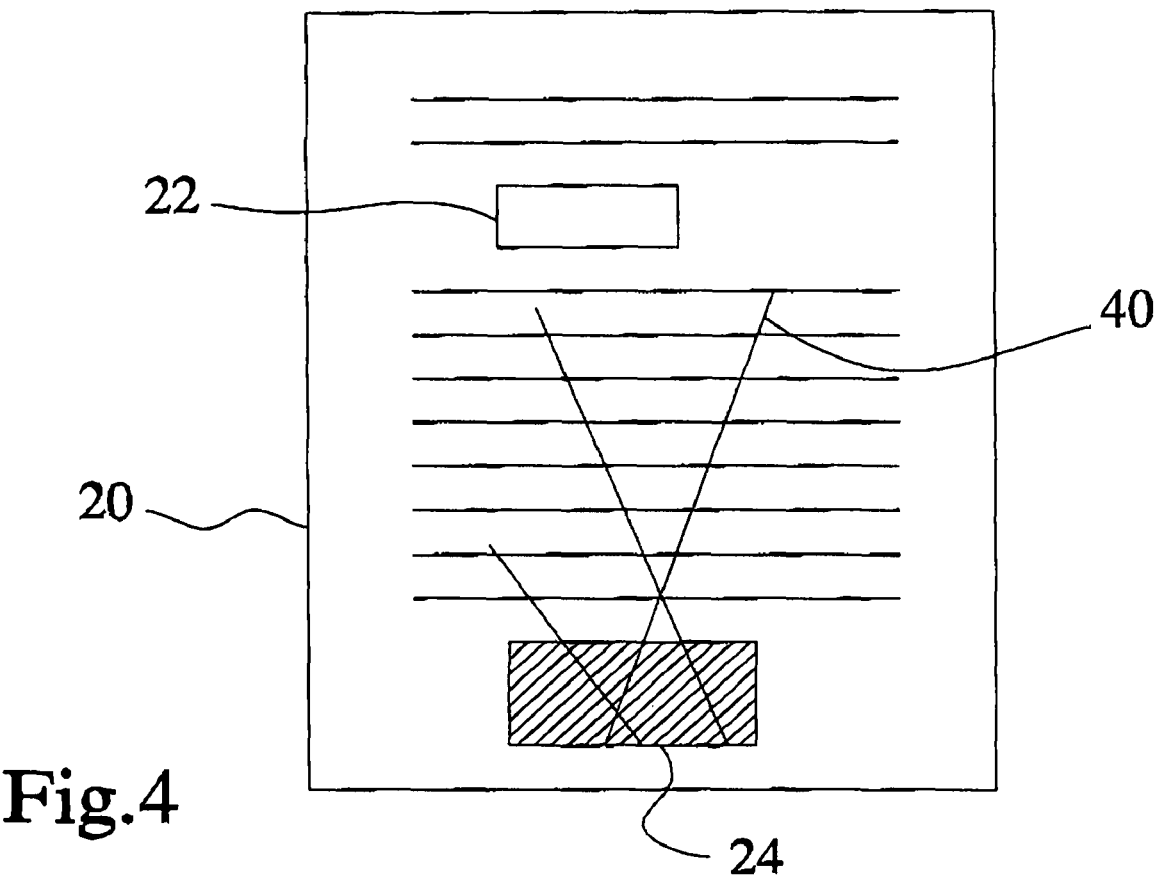
FIG. 4 shows a further printed form

FIG. 4 shows an example of a printed document that has been adapted in this way. In this example the third instructions have caused lines 40 to be drawn that extend over part of the text and over the barcode area. The angles of orientation of the lines are selected specific to the printed document, for example at random or dependent on the user input information. Thus, when an unscrupulous person replaces the barcode by another barcode with lines at a different angle this will be immediately noticeable.

Figure 5:
FIG. 5 shows a barcode

FIG. 5 shows a two dimensional barcode in which some elements have been removed. The barcode will be decoded according to a barcode standard that normally defines the generation of barcodes in terms of a set of configurations, each for representing a different codeword, that does not include any configuration with a white horizontal line in it. It is assumed that this standard provides for correction of errors, including some errors that result in a white line. According to an aspect of the invention the third instructions have caused an area 50 with a white line to be created in the barcode at a predetermined position, which thus does not conform to the standard, but can still be read. A human observer could verify that a barcode particular to the input field is present in the printed form by verifying the presence of the whiteline. Similarly, elsewhere in the barcode a black line has been created.

Figure 6:
FIG. 6 shows a barcode

FIG. 6 shows a two dimensional barcode in which the geometrical elements of a human readable word has been printed in the region occupied by the geometrical elements of the barcode. Again it is assumed that the barcode standard provides for correction of any errors induced by the presence of the word.

As an another application color differences may be introduced between geometrical elements that are treated as equal during decoding. For example, all geometrical elements in a horizontal rectangle that runs across a two-dimensional barcode may be given a color that differs from the color (or colors) of geometrical elements outside the rectangle. In a one dimensional barcode, similarly, the vertical bars that make up the barcode may each be printed as a composition of blocks of different colors. Thus a human readable message can be included in the barcode. It should be appreciated that the polygons that receive different colors may be selected as needed for the message, independent of the codeword that is represented different polygons in a part of the bar code that represents one codeword may receive different colors.

Figure 7:
FIG. 7 shows a barcode

FIG. 7 shows two barcodes a first barcode comprises vertical bars, and one of the bars forms a second barcode. The barcodes are arranged so that both the first and the second barcode can be decoded. In this case, when the embedded program generates commands to print the first barcode, the embedded program has to generate a command to print the one bar with a certain width, the embedded program adapts the commands used for printing this one bar dependent on the information that has to be represented in the second barcode. It will be appreciated that more than one of the bars of the first barcode may be treated in this way.

It will be appreciated that many other kinds of modifications of the barcodes are possible that do not affect the information that will be decoded when the barcode is read.

In one embodiment the third instructions used to realize this type of modification take the form of

```
function drawCodeword(location, codeword, additionalInformation)
{
  if (codeword =S1)
     drawElement(location+R11, additionalInformation)
     drawElement(location+R12, additionalInformation)
     drawElement(location+R13, additionalInformation)
     ....
  end if
  if (codeword =S2)
     drawElement(location+R21, additionalInformation)
     drawElement(location+R22, additionalInformation)
     drawElement(location+R23, additionalInformation)
     ....
  end if
  ..... other codeword
}
```

S1, S2 etc. are constants that correspond to the different codeword values that can be represented; R11, R12, R13, . . . are constants that represent the offset values of the different geometric elements that represent the codeword, relative to the location of the barcode area.

In this example additional information is supplied in addition to the codeword that is represented. The additional information parameter is used to modify the barcode in a way that does not affect later decoding of the barcode. In the example, a function "drawElement" is called a number of times. Each call has a location as argument to ensure that calls for a predetermined configuration of elements are executed, relative to a location of the barcode. The calls depend on the codeword that is represented, but are executed irrespective of the additional information, which is passed as an argument in the calls. An example of the implementation of drawElement is 3 function drawElement(location, additionalInformation) {if (overlap(location, additionalInformation)) issue("setColor RED"); else issue("setColor BLACK"); end if issue ("moveTo"+location); issue("printRectangle W, H");}

The function drawElement issues commands "setColor", "moveTo" and "printRectangle" to the printer, which command printing of a rectangle with a certain width and height, color and position (in other examples hexagons might be used instead of rectangles). In the example, the issued setColor command depends on the additional information: when the location at which the rectangle is to be drawn overlaps an area specified by the additional information a command to set the color to red is issued to the printer; otherwise a command is issued to set the color to black (the function "overlap" tests for this condition). It is assumed here that switching from red to black does not affect later decoding of the barcode.

It should be appreciated that the described program is merely an example. Similarly, the printer commands are shown by way of example only; any appropriate type of printer command may be used. Without deviating from the invention other programs may be used, in which the same or a different effect may be realized in another way. For example, commands to print certain rectangles at certain locations may be suppressed altogether, or commands to print additional rectangles may be added. In case of a two dimensional barcode, the selection of the configuration (performed by the "if statements" in the function for representing the codewords) may depend on the position where the codeword is represented in the barcode, as specified for example by the additional parameters.

Furthermore, although an embodiment of the invention has been described using network 12 between document server 10 and document processor 14 to transport the electronic document data as an interne message signal, it will be clear that other means of transport may be used, for example by providing the electronic document data on a disk, such as a floppy disk or an optical disk such as a CDROM. Similarly, although a local printer 18 has been shown, it should be understood that document processor 14 may in fact produce a further electronic document, which includes the barcode, for later printing at any convenient place and time.

Preferably, the document authoring program that the author uses to create the document provides for assembly of the embedded program in such a way that the author can adapt the barcode generation to the document, so that a document specific barcode is generated. For this purpose a set of building blocks programs may be provided that the author can use to assemble the embedded program when authoring the document, using for example a conventional text editor. Thus, in the example above, the functions drawBarcodeCodeword and drawelement could be provided as building blocks, the author programming in the embedded program with what argument "additionalInformation" the function drawBarcodeCodeword will be called for a given field.

In this way, the author also creates certain information in the barcode area that can be unique to the document. The use of the building blocks, such as functions like drawcodeword and drawElement, ensures that the added information does not affect later decoding. It will be understood that other ways of programming may be provided, for example by providing different functions or different parameters to specify the additional information. Highly structured forms of editing may be used, for example calling only for entry of a string that has to be human recognizable in the barcode, in which case the authoring software takes care that the embedded program is arranged in such a way that the specified string will be recognizable. Alternatively, less structured forms may be used, which provide more varied control over the embedded program.

I claim:

1. A method of obtaining printed instances of a document, the method comprising:
   distributing copies of electronic document data to document processors via a non-transitory medium, the electronic document data containing printing instructions for printing each instance from a respective one of the document processors;
   including a definition of a user data input field in the electronic document data, for receiving a user defined string of characters entered in said field;
   including an embedded control program with processing instructions embedded in the electronic document data, the embedded control program with processing instructions being linked to the user data input field, the embedded control program with processing instructions being distributed in the copies of the electronic document data, the embedded control program with processing instructions comprising:
      instructions instructing a processor to receive the user defined string of characters from the user data input field, instructions to control processing by the processor of the user defined string, instructions to derive a series of codewords from the characters in the user defined string from the linked user data input field, the embedded control program with processing instructions using the derived codewords to instruct the processor to generate commands to print geometrical elements of a bar code, the geometrical elements representing each codeword as a respective configuration of printed geometrical elements and their background in a respective area of the bar code.

2. A method according to claim 1, wherein the embedded control program with processing instructions is arranged to make at least one of the configurations dependent on a further factor other than the codeword represented by the configuration that will be decoded upon decoding the barcode.

3. A method according to claim 1, wherein the embedded control program with processing instructions makes the configurations dependent on the specific area in which the codeword is represented, so that mutually different configurations will result from representing a specific codeword dependent on whether the specific codeword is represented in one region or another.

4. A method as claimed in claim 3, wherein the embedded control program with processing instructions is arranged to control printing of the barcode as a two dimensional barcode, at least part of the areas having mutually different shapes, the embedded control program with processing instructions adapting the commands to print the elements of the configuration that is used to represent a codeword according to the shape of the area in which the codeword is represented.

5. A method as claimed in claim 3, wherein the embedded control program with processing instructions is arranged to include additional information in the areas, the additional information being independent of the codewords represented in the areas, the additional information being included by adding geometrical elements, removing geometrical elements and/or modifying visual properties of part of the geometrical elements that represent at least one of the codewords, dependent on the area in which the codeword is represented in a way that does not affect a decoded result when the barcode is decoded after scanning.

6. A method as claimed in claim 4, wherein the embedded control program with processing instructions is arranged to print additional geometrical elements that extend from within a region that is defined by all geometrical elements that will be used to decode the barcode in the printed document, to outside said region among further printed items of the document, so that the additional geometrical elements do not affect a decoded result when the barcode is scanned and decoded.

7. A method as claimed in claim 4, wherein the geometrical elements each have a property that does not affect the decoded data, the embedded control program with processing instructions being arranged to set said property in different ones of the geometrical elements in at least one area that represents a codeword differently during printing.

8. A method as claimed in claim 7, wherein the embedded control program with processing instructions is arranged to select a color and/or grey level density of different geometrical elements differently, as a predetermined function of position in an area where the barcode is printed.

9. A electronic document processor, comprising a user data input device and a connection for a printer, the electronic document processor having a non-transitory loaded electronic form that contains a definition of a user data entry field for receiving a string of input characters from a user, the processor being arranged to extract and execute an embedded control program with instructions that the processor receives embedded in the document, the embedded control program being linked to the user data input field, instructions of the embedded control program instructing the processor to process a series of codewords from the string and to generate commands to print geometrical elements of a bar code in electronic document data, dependent on the derived codewords, the instructions causing the processor to represent as a configuration of printed geometrical elements and their background in a respective area of the bar code.

10. An electronic document processor as claimed in claim 9, wherein the embedded control program with instructions is arranged to make at least one of the configurations dependent on a further factor other than the codeword represented by the configuration that will be decoded upon decoding the barcode.

11. An electronic document processor as claimed in claim 9, wherein the embedded control program with instructions makes the configurations dependent on the specific area in which the codeword is represented, so that mutually different configurations will result to represent a specific codeword dependent on whether the specific codeword is represented in one region or another.

12. An electronic document processor as claimed in claim 11, wherein the embedded control program with instructions is arranged to control printing of the barcode as a two dimensional barcode, at least part of the areas having mutually different shapes, the embedded control program with instructions adapting the commands to print the elements of the configuration that is used to represent a codeword according to the shape of the area in which the codeword is represented.

13. An electronic document processor as claimed in claim 11, wherein the embedded control program with instructions is arranged to include additional information in the areas, the additional information being independent of the codeword represented in the areas, the additional information being included by adding geometrical elements, removing geometrical elements and/or modifying visual properties of part of the geometrical elements that represent at least one of the codewords, dependent on the area in which the codeword is represented in a way that does not affect a decoded result when the barcode is scanned and decoded.

14. An electronic document processor as claimed in claim 13, wherein the embedded control program with instructions is arranged to print additional geometrical elements that extend from within a region that is defined by all geometrical elements that will be used to decode the barcode in the printed document, to outside said region among further printed items of the document, so that the additional geometrical elements do not affect a decoded result when the barcode is scanned and decoded.

15. An electronic document processor as claimed in claim 13, wherein the geometrical elements each have a property that does not affect the decoded data, the embedded control program with instructions being arranged to set said property in different ones of the geometrical elements in at least one area that represents a codeword differently during printing.

16. An electronic document processor as claimed in claim 15, wherein the embedded control program with instructions is arranged to select a color and/or grey level density of different geometrical elements differently, as a predetermined function of position in an area where the barcode is printed.

17. A non-transitory electronic form stored on a computer that contains a definition of a user data entry field for receiving a string of input characters from a user and an embedded control program with instructions embedded in the electronic form and linked to the user data input field, wherein the embedded control program with instructions is configured to instruct the computer to process a series of codewords from the characters in the string and generate commands to print geometrical elements of a bar code in electronic document data, dependent on the codewords, representing each codeword as a configuration of printed geometrical elements and their background in a respective area of the bar code.

18. An electronic form according to claim 17, wherein the embedded control program with instructions is arranged to make at least one of the configurations dependent on a further factor other than the codeword represented by the configuration that will be decoded upon decoding the barcode.

19. An electronic form according to claim 17, wherein the embedded control program with instructions makes the configurations dependent on the specific area in which the codeword is represented, so that mutually different configurations will result from representing a specific codeword dependent on whether the specific codeword is represented in one region or another.

20. An electronic form as claimed in claim 19, wherein the embedded control program with instructions is arranged to control printing of the barcode as a two dimensional barcode, at least part of the areas having mutually different shapes, the embedded instructions adapting the commands to print the elements of the configuration that is used to represent a codeword according to the shape of the area in which the codeword is represented.

21. An electronic form as claimed in claim 19, wherein the embedded control program with instructions is arranged to include additional information in the areas, the additional information being independent of the codewords that are represented in the areas, the additional information being included by adding geometrical elements, removing geometrical elements and/or modifying visual properties of part of the geometrical elements that represent at least one of the codewords, dependent on the area in which the codeword is represented in a way that does not affect a decoded result when the barcode is scanned and decoded.

22. An electronic form as claimed in claim 21, wherein the embedded control program with instructions is arranged to instruct printing additional geometrical elements that extend from within a region that is defined by all geometrical elements that will be used to decode the in the printed document, to outside said region among further printed items of the document, so that the additional geometrical elements do not affect a decoded result when the document is scanned and decoded.

23. An electronic form as claimed in claim 21, wherein the geometrical elements each have a property that does not affect the decoded data, the embedded control program with instructions being arranged to set said property in different ones of the geometrical elements in at least one area that represents a codeword differently during printing.

24. An electronic form as claimed in claim 23, wherein the embedded control program with instructions is arranged to select a color and/or grey level density of different geometrical elements differently, as a predetermined function of position in an area where the barcode is printed.

25. A non-transitory machine readable medium, comprising an electronic form stored on a computer according to claim 17.

26. A method of authoring a non-transitory electronic document, the method comprising:
  including a definition of a field for entering a string of characters in the document;
  providing software building blocks for building a control program with instructions embedded in the electronic document, the embedded control program with instructions being configured to cause a processor to receive and control processing of the string of characters from said field to transform the characters into commands to print geometrical elements of a bar code in electronic document data, so that the generated bar code is decodable according to a predetermined standard;
  assembling the building blocks into the electronic document during authoring of the document, while adapting the embedded control program with instructions to make a visual aspect of the bar codes generated under control of the embedded control program with instructions specific to the document and/or the field, without affecting a result of decoding the bar code;
  distributing copies of the electronic document with the embedded control program with instructions for receiving and processing the string of characters under control of the embedded control program after distribution.

27. A document authoring machine, for generating a non-transitory electronic document that includes a user input field for entering a string of characters and an embedded control program with instructions embedded in the electronic document and linked to the user input field, wherein the embedded control program with instructions is configured to cause a processor to receive and process the string of characters and to generate commands to print geometrical elements of a bar code, the machine comprising software building blocks for building the embedded control program with instructions so that the generated bar code is decodable according to a predetermined standard, and an editor for assembling the building blocks when the document is authored, the editor providing for adaption of the embedded control program with instructions to make a visual aspect of the bar codes generated under control of the embedded control program with instructions specific to the document and/or the user input field, without affecting a result of decoding the bar code.

* * * * *